US008832110B2

(12) United States Patent  (10) Patent No.: US 8,832,110 B2
Futty  (45) Date of Patent: Sep. 9, 2014

(54) MANAGEMENT OF CLASS OF SERVICE

(75) Inventor: Michael Edward Futty, Bridgeville, DE (US)

(73) Assignee: Bank of America Corporation, Charlotte, NC (US)

( * ) Notice: Subject to any disclaimer, the term of this patent is extended or adjusted under 35 U.S.C. 154(b) by 231 days.

(21) Appl. No.: 13/477,753

(22) Filed: May 22, 2012

(65) Prior Publication Data

US 2013/0318088 A1 Nov. 28, 2013

(51) Int. Cl.
G06F 17/30 (2006.01)
(52) U.S. Cl.
USPC .......................................................... 707/740
(58) Field of Classification Search
CPC ..................... G06F 17/30598; G06F 17/30705
USPC .......................................... 707/740, 783, 785
See application file for complete search history.

(56) References Cited

U.S. PATENT DOCUMENTS

| | | | |
|---|---|---|---|
| 5,692,177 A | 11/1997 | Miller | 395/608 |
| 5,941,947 A * | 8/1999 | Brown et al. | 709/225 |
| 6,990,492 B2 * | 1/2006 | Gupta | 1/1 |
| 7,386,122 B1 | 6/2008 | Guillou et al. | 380/30 |
| 2002/0162005 A1 * | 10/2002 | Ueda et al. | 713/182 |
| 2003/0167269 A1 * | 9/2003 | Gupta | 707/9 |
| 2004/0146208 A1 * | 7/2004 | Pazmino et al. | 382/232 |
| 2005/0223008 A1 * | 10/2005 | Kubota et al. | 707/9 |
| 2007/0198477 A1 * | 8/2007 | Lawton et al. | 707/3 |
| 2008/0209535 A1 | 8/2008 | Athey et al. | 726/11 |
| 2008/0270382 A1 * | 10/2008 | Thomsen et al. | 707/5 |
| 2008/0270462 A1 * | 10/2008 | Thomsen | 707/103 R |
| 2010/0011000 A1 * | 1/2010 | Chakra et al. | 707/9 |
| 2012/0324529 A1 * | 12/2012 | Rangachari et al. | 726/1 |

* cited by examiner

Primary Examiner — Joshua Bullock
(74) Attorney, Agent, or Firm — Michael A. Springs

(57) ABSTRACT

According to one embodiment of the present invention, classification of objects in a directory service may be managed. An object is identified in a directory service. Classification information associated with the object is received from a reference database. Using a processor, a rule that specifies a value that corresponds to the classification information is accessed. The accessed value is based on a power of two classification model. Using the processor, the class of service attribute is created using the value. The class of service attribute is associated with the object listed in the directory service using the processor.

17 Claims, 3 Drawing Sheets

| Server: domain.com/servers/server1 | | | | Cos: 5-1-1 | |
|---|---|---|---|---|---|
| Elevated Access Level | User Name | Domain\Account | Group Access Obtained Through | CoS | |
| RG-AdministratorsMembers | USER104A | domain1.com\user104A | domain1.com\admins | 1-1-5 | ◉ |
| RG-AdministratorsMembers | USER104B | domain2.com\user104B | domain2.com\admins | 1-1-5 | ◉ |
| RG-AdministratorsMembers | USER104C | domain3.com\user104C | domain3.com\dba | 4-1-4 | ◉ |
| RG-AdministratorsMembers | USER104D | domain3.com\user104D | domain3.com\dba\developers | 5-1-4 | ◉ |
| RG-PowerUsersMembers | USER104E | domain1.com\user104E | domain1.com\l4support | 1-1-1 | ◉ |
| RG-PowerUsersMembers | USER104F | domain1.com\user104F | domain1.com\l4sopport | 1-1-1 | ◉ |
| UR-LogonLocally | USER104G | domain1.com\user104G | domain1.com\secretaries | 0-1-0 | ◉ |

MANAGEMENT OF CLASS OF SERVICE

TECHNICAL FIELD

This invention relates, in general, to class of service and, more particularly, to management of class of service.

BACKGROUND OF THE INVENTION

An organization has employees that take on various roles in an organization. Additionally, the organization typically has multiple resources that assist the employees in carrying out their various roles. In one sense, the resources have specific roles to carry out themselves. Employees may have access rights to the resources specific to their role. Over time, the roles that employees and resources have in the organization may change.

SUMMARY OF EXAMPLE EMBODIMENTS

In accordance with the present invention, disadvantages and problems associated with managing classification of objects in a directory service may be reduced or eliminated.

According to one embodiment of the present invention, classification of objects in a directory service may be managed. An object is identified in a directory service. Classification information associated with the object is received from a reference database. Using a processor, a rule that specifies a value that corresponds to the classification information is accessed. The accessed value is based on a power of two classification model. Using the processor, the class of service attribute is created using the value. The class of service attribute is associated with the object listed in the directory service using the processor.

Certain embodiments of the invention may provide one or more technical advantages. A technical advantage of one embodiment allows for automatically categorizing users and resources by accessing one or more reference databases. Another technical advantage of an embodiment allows for automated reporting of users having elevated access rights to resources when they should not because of their class of service. Another technical advantage of an embodiment allows for this classification and reporting to be done on multiple platforms, such as Active Directory and Network Information Services. Another technical advantage of an embodiment is the ability to determine whether a possible mismatch occurs based on mathematical operations on the numerical values that represent the associated classes of service.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and for further features and advantages thereof, reference is now made to the following description taken in conjunction with the accompanying drawings, in which:

FIG. 3 illustrates an exemplary embodiment of a graphical user interface operable to report possible class of service mismatches between a server resource and users that have privileges to access the server resource.

DETAILED DESCRIPTION OF EXAMPLE EMBODIMENTS

Figure 1:
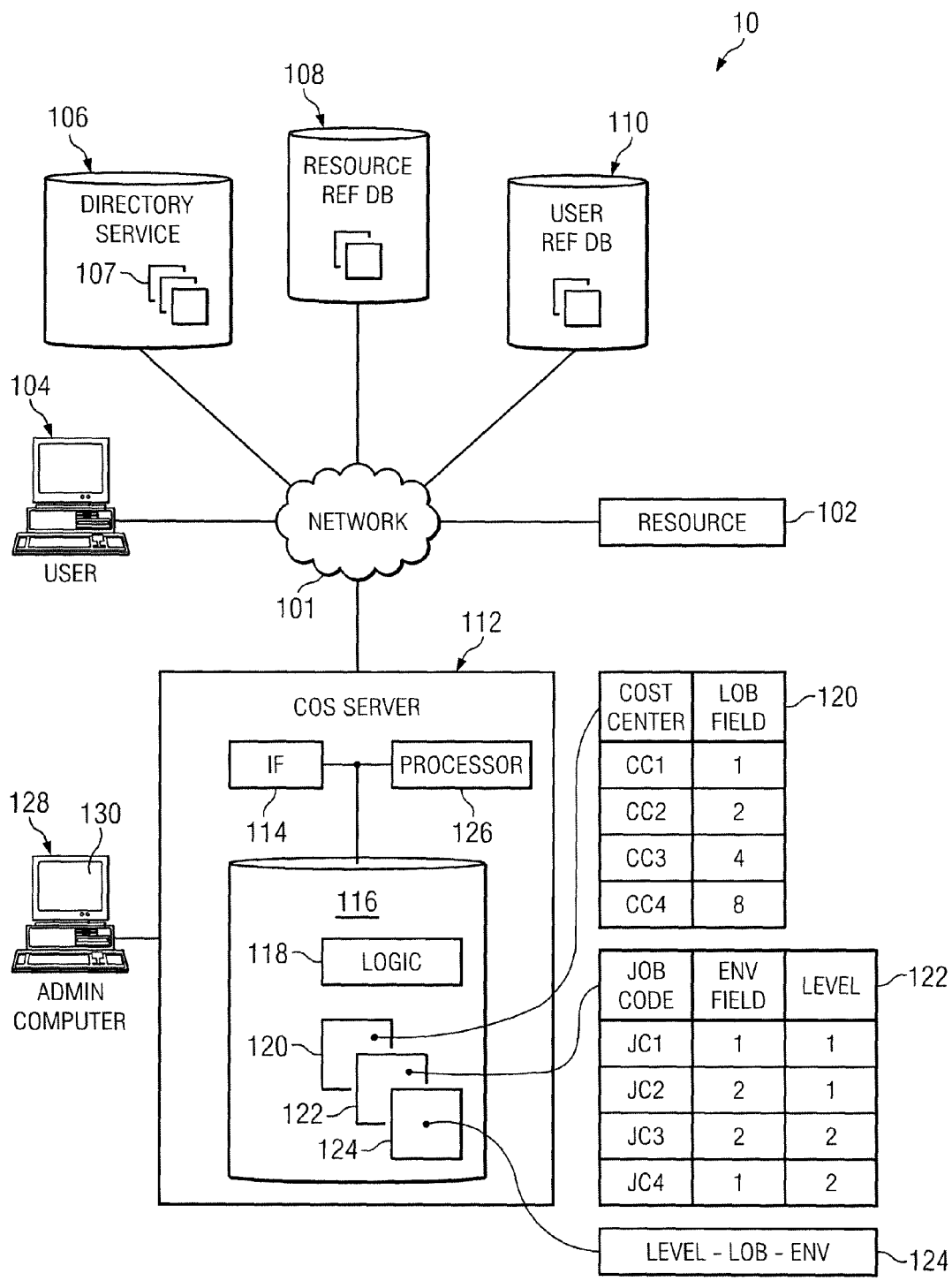
FIG. 1 illustrates an exemplary system operable to manage classification of service for objects in a directory service.
Figure 2:
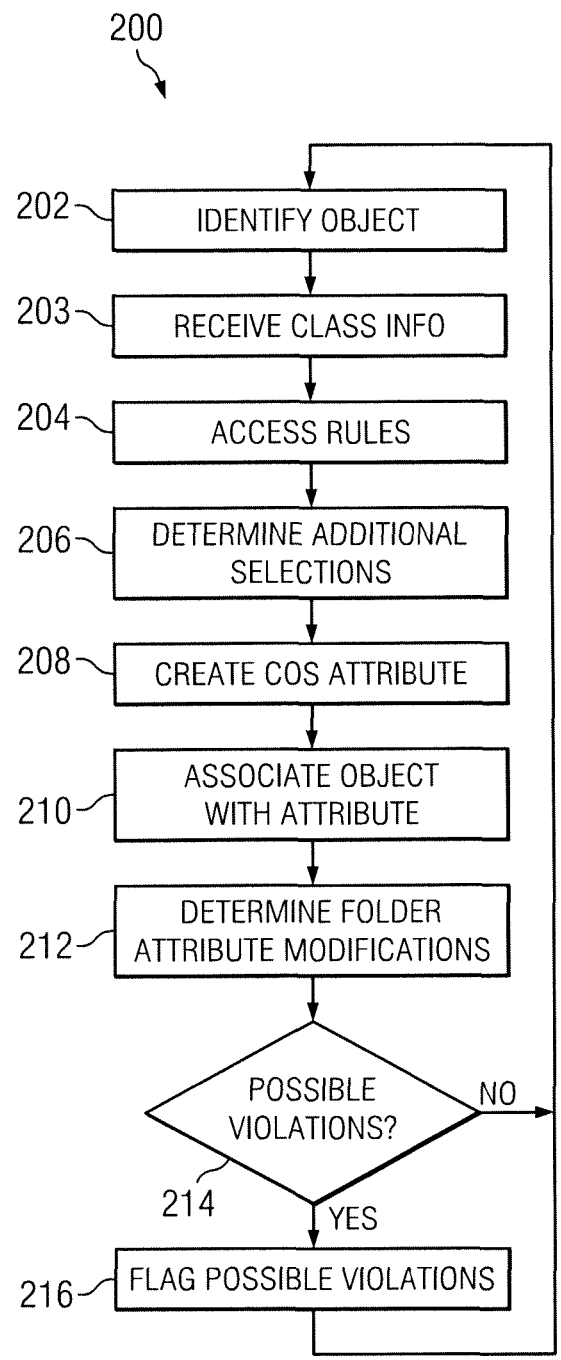
FIG. 2 illustrates an exemplary method for managing classification of service for an object listed in a directory service.

Embodiments of the present invention and its advantages are best understood by referring to FIGS. 1 through 3, like numerals being used for like and corresponding parts of the various drawings.

FIG. 1 illustrates a system 10 that manages classification of service for objects representative of resources 102 and users 104. In other words, particular embodiments of system 10 keep track of the services provided by resources 102 and users 104. By keeping track of (1) the services that users and resources are supposed to provide and (2) the actual access rights involved between users 104 and resources 102, system 10 can report if there are possible mismatches. System 10 also includes a directory service 106, a resource reference database 108, and a user reference database 110 that contain information associated with resources 102 and users 104. Class of service server 112 uses this information to create, maintain, and/or monitor class of service attributes associated with objects representative of resources 102 and users 104. The various components of system 10 communicate with one another over a network 101.

Network 101 represents any suitable network that facilitates communication between the components of system 10. Network 101 may include any interconnecting system capable of transmitting audio, video, signals, data, messages, or any combination of the preceding. Network 101 may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, any other suitable communication link, including combinations thereof operable to facilitate communication between the components of system 10.

Resources 102 are used by users 104 to carry out any suitable function of an organization. Resources 102 may be printers, computers, servers, or any other device suitable for carrying out organizational functions. For example, in a banking organization, resources 102 may be servers used to facilitate ATM/Debit card transactions, provide access to customer accounts through on-line banking, facilitate interactive voice response ("IVR") functions, facilitate access and review of loan applications by the bank's employees, provide access to stock/fund information for investment opportunities, enable employees to access shared workspaces, any other suitable function, or any combination of the preceding. In particular embodiments, resources 102 may be characterized as production servers (i.e., those utilized for actual operation of the various functions) while others are characterized as non-production servers (i.e., those utilized for development and/or testing of the functions carried out by the production resources).

Resources 102 may include a network server, any suitable remote server, a mainframe, a host computer, a workstation, a web server, a personal computer, a file, server, or any other suitable device operable to carry out functions specified by an organization. In some embodiments, resources 102 may execute any suitable operating system such as IBM's z/OS, MS-DOS, PC-DOS, MAC-OS, WINDOWS, UNIX, OPenVMS, Linux, Android, or any other appropriate operating systems, including operating systems developed in the future. The functions of resources 102 may be performed by any suitable combination of one or more servers or other components at one or more locations. In an embodiment where resources 102 are servers, the servers may be public or private servers, and each server may be a virtual or physical server. A particular resource 102 may comprise multiple servers, which may be at the same location or at locations remote from one another.

Users 104 require access to resources 102 to perform certain functions, such as those listed above with respect to resources 102. Where appropriate, user 104 refers to a person, computing machine, or both that attempt to utilize resource 102. A computing machine may comprise a personal computer, laptop, wireless or cellular telephone, personal digital assistant, any of the devices listed as options for resource 102, any other device suitable for communicating information in system 10, and any suitable combination of the preceding. In particular embodiments of system 10, a specific user 102 must have appropriate privileges to access a specific resource 102, which will be described in more detail below.

Directory service 106 includes objects that represent resources 102 and users 104. Additionally, directory service 106 stores information associated with a particular object as attributes for the object. For example, attributes may indicate any associated network address, access privileges, class of service, any other suitable information associated with the object, and any suitable combination of the preceding. Directory service 106 maintains information suitable to authenticate a user 104 who desires access to a particular resource 102.

Particular embodiments of directory service 106 comprise folders, which may contain objects or other folders. User objects may be grouped together into a folder (i.e., a user group) in directory service 106. Likewise, resource objects may be grouped together into a folder (i.e., a resource group) in directory service 106. A particular object may be a member of multiple folders in directory service 106. For example, a user object may be a part of two folders (i.e., user groups) that, as described in more detail below, grant the user access to resources for which the user groups have associated privileges.

Directory service 106 may maintain attributes associated with a particular folder, with the attributes optionally having information similar to that described above for other objects. The attributes of a particular folder may depend on the attributes of one or more of its member objects. For example, a class of service attribute for a particular folder may be an algorithmic combination of the class of service attributes of each of its member objects. Additionally, in certain embodiments, the attributes of a folder may affect the objects of the group. For example, an administrator, manager, or other suitable entity may assign an access rights attribute to a folder representing a user group, where the attribute grants the users of the group access to a particular resource or resource group.

Directory service 106 comprises a memory that stores, either permanently or temporarily, data, operational software, or other information. For example, directory service stores information associated with user and resource objects in memory structures 107. Directory service 106 includes any one or a combination of volatile or nonvolatile local or remote devices suitable for storing information. For example, directory service 106 may include random access memory (RAM), read only memory (ROM), magnetic storage devices, optical storage devices, database and/or network storage, removable storage media, or any other suitable information storage device or a combination of these devices. In particular embodiments, directory service 106 may be Active Directory, Network Information Service (NIS), any other suitable directory service, and/or any suitable combination of the preceding.

Resource reference database 108 and user reference database 110 store information associated with users 104 and resources 102, respectively. For example, resource reference database 108 may store information indicating which cost center of an organization is charged with fees associated with a particular resource 102. Resource reference database 108 also may store information indicating whether a particular resource 102 is a production or non-production resource. Similarly, user reference database 110 may store information indicating which cost center of an organization is charged with fees associated with salary and/or benefits of a particular user 104. Additionally, user reference database 110 may store a job code associated with a particular user 104. The job code may indicate a function or service provided by a particular user 104. Resource reference database 108 and user reference database 110 may store any other suitable information. This information may be modified. For example, when a user 104 changes roles within an organization the cost center charged with the user's salary may change. As another example, a resource 102, such as a server, may be changed from a production to a non-production resource or may be repurposed for a new function associated with a different cost center. In such cases, the information stored in resource reference database 108 and user reference database 110 may be updated to reflect those changes. Where appropriate, resource reference database 108 and user reference database 110 comprise memory similar to that described above with respect to directory service 106.

Class of service server 112 creates and/or monitors class of service attributes associated with objects listed in directory service 106. Class of service server 112 may include a network server, any suitable remote server, a mainframe, a host computer, a workstation, a web server, a personal computer, a file, server, or any other suitable device operable to carry out functions specified by an organization. In some embodiments, class of service server 112 may execute any suitable operating system such as IBM's z/OS, MS-DOS, PC-DOS, MAC-OS, WINDOWS, UNIX, OPenVMS, Linux, Android, or any other appropriate operating systems, including operating systems developed in the future. The functions of class of service server 112 may be performed by any suitable combination of one or more servers or other components at one or more locations. Class of service server 112 may be public or private, and may be a virtual or physical server. Class of service server 112 may comprise multiple servers, which may be at the same location or at locations remote from one another. In certain embodiments, class of service server 112 may be a part of a larger system that handles several functions within system 10. In certain embodiments, class of service server 112 includes a network interface 114, a memory 116, and a processor 126.

Network interface 116 represents any suitable device operable to receive information from network 101, perform suitable processing of the information, communicate to other devices, or any combination of the preceding. For example, network interface 116 may receive a request for creation of a class of service attribute for an object in directory service 106. Network interface 116 passes information from the request to processor 126 and memory 118, as needed, for further processing. As another example, network interface 116 may receive information associated with a particular resource 102 from resource reference database 108. Network interface 116 represents any port or connection, real or virtual, including any suitable hardware and/or software, including protocol conversion and data processing capabilities, to communicate through a LAN, WAN, or other communication systems that allow class of service server 112 to exchange information with the components of system 10. Processor 126 communicatively couples to network interface 116 and memory 116. Processor 126 controls the operation and administration of class of service server 112 by processing information received from network interface 116 and memory 116. Processor 126 includes any hardware and/or software that operates to control and process information. For example, processor 126 executes logic 116 to control the operation of class of service server 112. In certain embodiments, processor 126 executes instructions to calculate suitable values for the fields of a class of service attribute. As another example, processor 126 executes instructions to check for possible class of service violations as evidenced by the class of service attributes of user objects and resource objects in directory 106. Processor 126 may be a programmable logic device, a microcontroller, a microprocessor, any suitable processing device, or any suitable combination of the preceding.

Memory 116 stores, either permanently or temporarily, data, operational software, or other information for processor 126. Memory 116 includes any one or a combination of volatile or nonvolatile local or remote devices suitable for storing information. For example, memory 116 may include random access memory (RAM), read only memory (ROM), magnetic storage devices, optical storage devices, database and/or network storage, removable storage media, or any other suitable information storage device or a combination of these devices. While illustrated as including particular modules, memory 116 may include any suitable information for use in the operation of class of service server 112. In particular embodiments, memory 116 includes logic 118, a cost center translation table 120, a job code translation table 122, and a class of service attribute 124.

Logic 118 represents any suitable set of instructions, software, or code embodied in a computer-readable storage and operable to facilitate the operation of class of service server 118. For example, logic 118 may include instructions that indicate that processor 126 should retrieve a job code associated with a user from user reference database 110 and use that job code in creating a class of service attribute for that user. As another example, logic 118 may include instructions that specify that class of service server 112 should analyze class of service attributes to determine whether a user object is inappropriately apart of a user group.

Cost center translation table 120 includes rules for associating a cost center with a value that represents the line-of-business associated with the cost center, in accordance with a power of two assignment model. In the example illustrated in FIG. 1, cost center code "CC1" is associated with a line-of-business value of "1." This value could represent any line of business, such as Mortgage Home Equity in a banking organization. Similarly, cost center code "CC2" is associated with a line-of-business value of "2," cost center code "CC3" is associated with a line-of-business value of "4," and cost center code "CC4" is associated with a line-of-business value of "8." In particular embodiments, multiple cost center codes are associated with the same value for line-of-business. For example, cost center translation table 120 may include a cost center code "CC5" associated with line-of-business value of 4 such that both codes "CC3" and "CC5" are associated with the same line-of-business value. Additionally, there may be additional possible selections for the value representing line-of-business. In particular embodiments, the additional possible selections will be a power of two.

Job code translation table 122 includes rules for associating a user job code with a level value and an environment value, in accordance with a power of two assignment model. A level value may indicate a level associated with the role a user provides. For example, a user that is associated with a level value of "1" may indicate that the user's role relates only to one or more applications that run on a resource 102. On the other hand, a user that is associated with a level value of "2" may indicate that the user's role relates to the entire operating system that runs on a resource 102. An environment value may indicate whether a user has a non-production role (i.e., functional related to development) or a production role. For example, an environment value of a "1" may indicate that a user has a non-production role while an environment value of a "2" may indicate that user has a production role. In the example illustrated in FIG. 1, job code "JC1" is associated with an environment value of "1" and a level of "1." Job code "JC2" is associated with an environment value of "2" and a level of "1." Job code "JC3" is associated with an environment value of "2" and a level of "2." Job code "JC4" is associated with an environment value of "1" and a level of "2." As shown, multiple job codes may be associated with the same environment value and multiple job codes may be associated with the same level. Additionally, there may be additional possible selections for the value representing the environment and the value representing the level. In particular embodiments, the additional possible selections will be a power of two.

Class of service attribute 124 represents any class of service attribute created by class of service server 112. Class of service attribute 124 comprises one or more fields each representing a category of information. Each field may be separated by a delimiter, such as a dash "-" symbol. In some embodiments, each field may be allocated a fixed number of characters, bits, or any other suitable metric and optionally may leave out a delimiter. In the embodiment depicted in FIG. 1, class of service attribute has three fields separated by dashes. The first field is the level field, which may be derived from job code translation table 122. The second field is the line-of-business field, which may be derived from cost center translation table 120. The third field is the level field, which may be derived from cost center translation table 120. In certain embodiments, class of service server 112 stores class of service attribute 124 temporarily in memory 116 before storing the value as an associated attribute of an object and/or folder in directory service 106.

In certain embodiments, a user 104 may be associated with multiple selections of a particular field in class of service attribute 124. For example, a user may be associated with multiple cost centers, which may indicate that the user has roles in multiple lines-of-business of an organization. In such a case, class of service server 112 may calculate a sum of the values representing the individual selections of the field. The calculated sum may then be stored as the value of the line-of-business field in class of service attribute 124 for the particular user 104. Class of service server 112 may determine that a user 104 is associated with multiple lines of business by parsing information retrieved from user reference database 110, receiving a special instruction specifically regarding user 104 from administrative computer 128, and/or from any other suitable source.

Memory 116 may use the same or different tables to create class of service attributes for resources 102. For example, cost center codes associated with resources 102 may be the same as cost center codes associated with users 104. Accordingly, class of service server 112 may retrieve the applicable cost center for a particular resource 102 from resource reference database 108. Then, class of service server 112 may use cost center translation table 120 to determine the appropriate value for a line-of-business field for the particular resource 102. In certain embodiments, class of service server may use a different table to determine the appropriate value for line-of-business field for the resource 102. In a similar fashion, values for a level field and for an environment field may be determined for the resource 102.

Class of service server 112 may create class of service attributes for folder objects in directory service 106 as well. In certain embodiments, a field value for a class of service attribute for a folder is an algorithmic combination of the corresponding field values of one or more of its member objects. As one non-limiting example, class of service server 112 determines the selected values for the field of interest for each of its member objects. Class of service server 112 then calculates a sum of each unique selection of the field. For example, suppose a folder has two member objects. The first object has a value for the line-of-business field of "6." The second object has a value for the line-of-business field of "12." Because of the power of two assignment model for this field, class of service server 112 determines the selected values of the field by subtracting the largest possible power of two numbers until reaching zero. For the first object, that results in selected values of "4" and "2." For the second object, that results in selected values of "8" and "4." The unique selections for the field then become "8," "4," and "2." Accordingly, class of service server 112 will calculate the value for the line-of-business field attribute of the folder to be "14" as the sum of the unique selections of the field in its member objects. Conversely, class of service server 112 may determine the lines of business represented in a folder of directory service 107 by going through the same subtraction operation on the value of the line-of-business field of the class of service attribute associated with the folder.

Class of service server 112 associates class of service attribute 124 with an object by instructing directory 106 to store class of service attribute 124 as an attribute of the appropriate object. In some embodiments, class of service server 112 may automatically update a class of service attribute in directory service 106 in response to detection of updated information in one or more of resource reference database 108 and user reference database 110. For example, resource reference database 108 and user reference database 110 may be configured to alert class of service server 112 when information associated with a resource 102 and/or a user 104 is updated. In certain embodiments, administrative computer 128 may direct class of service server 112 to update the class of service attributes for one or more objects listed in directory service 106.

Rules in logic 118 may instruct class of service server 112 to check for possible class of service violations among the objects listed in directory service 116. For example, class of service server 112 may analyze the line-of-business fields of the class of service attributes for the objects that are apart of a folder to determine whether multiple lines of business selections are present. As one example of determining this, class of service server 112 may analyze the line-of-business attribute of the folder itself. Class of service server 112 may determine whether multiple lines-of-business are present by using the iterative subtraction method described above. If more than one line of business is present among a folder, class of service server 112 may flag that for immediate and/or later reporting to administrative computer 128, for example. Rules in logic 118 may instruct class of service server 112 to check for and report multiple selections in any other field in a similar manner. For example, class of service server 112 may check the environment field of a folder that holds resources 102. If the folder holds both production resources and non-production resources, class of service server 112 may report this as a possible violation to administrative computer 128.

As another example of checking for a violation, class of service server 112 may access a user group in directory service 106. The user group has a class of services attribute and an access privileges attribute. The access privileges attribute grants privileges to the users of a resource group. Class of service server 112 compares the class of service attribute of the user group with the class of service attribute of the resource group. Class of service server 112 may report a possible violation if, for example, the line-of-business fields of both attributes do not match. This may indicate that users from a certain line-of-business have access to resources of another line-of-business. Additionally, class of service server 112 may report a possible violation if, for example, the environment field of the class of service attribute of the user group indicates non-production user roles while the environment field of the class of service attribute of the resource group indicates the group has production resources. In certain embodiments, class of service server 112 does not report a possible violation if the environment field of the class of service attribute of the user group indicates production user roles while the environment field of the class of service attribute of the resource group indicates the group has non-production resources. This is because it may be appropriate for users with production roles to have access to non-production resources. Logic 118 may instruct class of service server 112 to perform any other suitable operation to check for possible class of service violations.

Administrative computer 128 represents any suitable components that facilitate establishment and/or modification of the configuration of class of service server 112. An administrator may use administrative computer 128 to update the rules used by class of service server 112 to assign the values to fields of a class of service attribute. For example, the administrator may update cost center translation table 120 with additional cost centers that are assigned to power of two values. The administrator may also add additional translation tables for use in deriving values for additional fields that may become a part of the class of service attribute.

Administrative computer 128 may also direct class of service server 112 to add additional selections to a field beyond what is indicated by information retrieved from resource reference database 108 and user reference database 110. By way of example and not limitation, this may happen if a resource 102 or a user 104 is being leveraged across multiple lines-of-business. As such, their class of service may reflect these multiple affiliations, even if the link to the additional lines of business is not reflected in reference databases 108 and 110.

Administrative computer 128 also may instruct class of service server 112 to perform a check for possible class of service violations in objects listed in directory service 106. Resources 102 and users 104 may change roles within an organization. Even with changed roles, objects representing resources 102 and users 104 may linger in folders on directory service 106 that are associated with the prior role. When class of service server 112 checks for possible violations as directed by administrative computer 128, it may begin by updating the class of service attributes in directory service 106 using information retrieved from resource reference database 108 and user reference database 110. Then, class of service server 112 may perform a check for possible violations as described above. In some embodiments, class of service attributes in directory service 106 will be automatically updated as information in reference databases 108 and 110 are updated. As such, class of service server 112 may be configured to automatically check for and report possible violations.

Administrative computer 128 may facilitate a check for possible class of service mismatches using graphical user interface ("GUI") 130. GUI 130 is operable to display information received from class of service server 112. GUI 130 also tailors and filters data entered by and presented to the user of administrative computer 128. GUI 130 may provide the user with an efficient and user-friendly presentation of information. For example, GUI 130 may display information regarding whether there are any possible class of service mismatches between a particular user 104 and any of the resources 102 that user 104 has the privileges to access. GUI 130 may comprise a plurality of displays having interactive fields, pull-down lists, and buttons operated by the user. GUI 130 may include multiple levels of abstraction including groupings and boundaries. It should be understood that the term GUI may be used in the singular or in the plural to describe one or more GUIs and each of the displays of a particular GUI 130.

GUI 130 may be displayed on administrative computer 128 using any suitable application program. For example, GUI 130 may be presented as an add-on to Microsoft Forefront Identity Manager. As another example, GUI 130 may be presented using a web browser that allows a user of administrative computer 128 to interact with class of service server 112. Suitable web browsers may include Microsoft Internet Explorer®, Mozilla Firefox®, Google Chrome™, Apple Safari™, or Opera®.

Administrative computer 128 may instruct class of service server 112 to provide a report of possible mismatches associated with any suitable object from directory service 106. For example, administrative computer 128 may instruct class of service server 112 to report possible violations for all users 104 that have access to a particular resource 102. In such a case, GUI 130 may display all users 104 that have access to the particular resource 102 and provide an indication that the class of service for a particular user 104 is a possible mismatch for the particular resource 102. The indication may be by any suitable means, such as a distinct color, shape, highlight, arrow, or any suitable combination of the preceding. Administrative computer 128 and/or a user of administrative computer 128 may then decide whether a particular user 104 should retain access to the particular resource 102.

As another example, administrative computer 128 may instruct class of service server 112 to display all resources 102 for which a particular user 104 has been given access. In such a case, GUI 130 may display all resources 102 accessible to the particular user 104 and provide an indication of whether there is a possible mismatch, using any suitable indication mechanism as described above. Administrative computer 128 and/or a user of administrative computer 128 may then decide whether the particular user 104 should retain access each of the particular resources 102 for which class of service server 112 reported possible mismatches.

In certain embodiments, administrative computer 128 may instruct class of service server 112 to report possible mismatches associated with a particular user group defined in directory service 106. In such a case, GUI 130 may display all members of the particular user group and indicate if there is a possible mismatch between the class of service of the user group and the class of service for each member of the user group. Administrative computer 128 and/or a user of administrative computer 128 may then decide whether each of the users for which class of service server 112 reported a possible mismatch should remain a member of the particular user group. Alternatively or additionally, class of service server 112 may report and GUI 130 may display possible class of service mismatches between a particular user group and any resources or resource groups to which the user group has access privileges.

In some embodiments, administrative computer 128 may instruct a class of service server 112 to report possible mismatches associated with a particular resource group defined in directory service 106. In such a case, GUI 130 may display all members of the particular resource group and indicate if there is a possible mismatch between the class of service of the resource group and the class of service for each member of the resource group. Administrative computer 128 and/or a user of administrative computer 128 may then decide whether each of the resources for which class of service server 112 reported a possible mismatch should remain a member of the particular resource group. Alternatively or additionally, class of service server 112 may report and GUI 130 may display possible class of service mismatches between a particular resource group and any user or user groups which have access privileges to the particular resource group.

Administrative computer 128 may comprise a network server, any suitable remote server, a mainframe, a host computer, a workstation, a web server, a personal computer, a file, server, or any other suitable device operable to interact with class of service server 112. In some embodiments, administrative computer 128 may execute any suitable operating system such as IBM's z/OS, MS-DOS, PC-DOS, MAC-OS, WINDOWS, UNIX, OPenVMS, Linux, or any other appropriate operating systems, including operating systems developed in the future. The functions of administrative computer 128 may be performed by any suitable combination of one or more servers or other components at one or more locations. In the embodiment where the modules are servers, the servers may be public or private servers, and each server may be a virtual or physical server. The server may include one or more servers at the same location or at locations remote from one another. Also, administrative computer 128 may include any suitable component that functions as a server.

In an exemplary embodiment of operation of system 10, class of service server 112 creates a class of service attribute 124 for a user object listed in directory service 106 that represents a particular user 104. Class of service server 112 retrieves information associated with the user 104 from the user reference database 110. The information retrieved from user reference database 110 indicates that the user 104 is associated with cost centers "CC 1" and a cost center "CC3." The information retrieved from user reference database 110 also indicates that the user 104 is associated with job code "JCL" To determine the appropriate value for the line-of-business field, class of service server 112 consults cost center translation table 120. Upon determining that the appropriate value for cost center CC1 is "1" and for cost center CC3 is "4", class of service server 112 calculates their sum of "5" as their appropriate value to use for the line-of-business field for class of service attribute 124. To determine the appropriate value for the level field, class of service server 112 consults job code translation table 122. Upon determining that the appropriate value for job code JC1 is "1," class of service server 112 stores a "1" in the level field of class of service attribute 124. To determine the appropriate value for the environment field, class of service server 112 consults job code translation table 122. Upon determining that the appropriate value for job code JC1 is "1," class of service server 112 stores a "1" in the environment field of the class of service attribute 124. Class of service server 112 stores class of service attribute 124 in directory service 106 with the appropriate user object.

The user object with the class of service attribute 124 is a part of a user group in directory service 106. Upon creating class of service attribute 124, class of service server 112 automatically updates the class of service attribute for the user group by aggregating the class of service attributes of its membership as described above. After updating the class of service attribute for the user group, class of service server automatically checks for possible class of service mismatches created by associating class of service attribute 124 with the user object in directory service 106. Class of service server 112 reports any possible class of server mismatches to administrative computer 128 for display on GUI 130.

In another exemplary embodiment of operation, administrative computer 128 instructs class of service server 112 to analyze the associations of a particular resource 102 for possible mismatches. Class of service server 112 determines which users 102 have privileges to access the particular resource 102 by parsing the access rights attribute of one or more user groups in directory service 106. Class of service server 112 determines possible class of service mismatches and reports its findings to administrative computer 128.

A component of system 10 may include an interface, logic, memory, and/or other suitable element. An interface receives input, sends output, processes the input and/or output, and/or performs other suitable operations. An interface may comprise hardware and/or software. Logic performs the operations of the component. For example, logic executes instructions to generate output from input. Logic may include hardware, software, and/or other logic. Logic may be encoded in one or more non-transitory, tangible media, such as a computer readable storage medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 10 without departing from the scope of the invention. For example, class of service server 112 and administrative computer 128 may be merged into one component. In another example, system 10 may include any number of suitable reference databases in addition to resource reference database 108 and user reference database 110. In some embodiments, the reference databases may be excluded or combined into one database. In another example, system 10 may exclude GUI 130 such that requests initiated by administrative computer 128 to check for possible mismatches are initiated using a command line interface or other suitable interface. Additionally, class of service attribute 124 may comprise certain fields, where those fields are not assigned power of two values. In such embodiments, the values may be any suitable numeric or non-numeric value. Also, although depicted as tables in FIG. 1, cost center translation table 120 and job code translation table 122 may be any suitable memory structures operable to facilitate determination of appropriate values that correspond to a cost center and job code, respectively.

As another example, the reporting features of class of service 112 may be initiated at any suitable time. For example, class of service 112 may check for mismatches periodically (such as, daily, weekly, monthly, etc.), according to a predefined schedule, based upon a user-initiated request, in response to creation of a class of service attribute, in response to updated information in a reference database, any other suitable time, and/or any suitable combination of the preceding.

FIG. 2 illustrates an exemplary method 200 for managing class of service of an organization.

At step 202, an object listed in a directory service is identified. This may happen in several ways. For example, a class of service server may receive information identifying the object from an administrative computer, detect a change in information associated with the object in a reference database, or identify the next object in a list of objects where those objects are processes by the class of service server according to a preset schedule. At step 203, classification information associated with the object is received from a reference database. This classification information relates to the class of service for the user. For example, for a user object, classification information may include a cost center and job code associated with the user represented by the user object. As another example, for a resource object, this classification information may include a cost center and a resource classification associated with the user.

At step 204, rules are accessed that specify values that correspond to the classification information retrieved during step 204. The possible values may be stored in a suitable memory structure. The value may be a number that is a power of two. The value may be used as a field in the class of service attribute as representing a category of information, such as a line-of-business. At step 206, the method determines whether the object is associated with additional selections within the category. For example, a resource object associated with two lines of business will have additional selections within the line-of-business category. The additional selections may also correspond to a second value that is a power of two. The method calculates the sums of the first and second value to create an aggregate value for the field in the class of service attribute representing the category of information. At step 208, a class of service attribute is created using the value determined in step 210. In some embodiments, a value may be determined for multiple categories of information. Each of these values may be used in the resulting class of service attribute as a field representing a category of information. The method associates the attribute with the object in the directory service at step 210. This may be done, for example, by storing the class of service attribute in the directory service as an attribute of the object.

At step 212, the method determines whether the object is a member of a folder in the directory service and, if so, creates and/or updates a class of service attribute associated with the folder. A portion of the class of service attribute for the folder may depend on the values for the class of service attributes for its member objects, as described above in the discussion corresponding to FIG. 1.

At step 214, the method checks for possible violations or mismatches among the classes of service created by the addition of the class of service attribute for the object. Possible mismatches may occur between the object, its folder, another object, and/or any other suitable entity in the directory service. At step 216, the method reports the possible violations to an administrative computer for further follow-up. The method then loops back to step 202 to repeat the process for additional objects. The process may also be repeated for the same object if information associated with the object is modified in one or more reference databases.

Modifications, additions, or omissions may be made to method 200 disclosed herein without departing from the scope of the invention. The methods may include more, fewer, or other steps. For example, the method may exclude step 206, such that the value placed in a field of the class of service attribute always corresponds to one selection in the corresponding category. As another example, the method may include an additional step, wherein an administrative computer manually dictates all or part of a class of service attribute. Additionally, steps may be performed in parallel or in any suitable order. For example, the rule accessed in step 204 to determine a first value for a category may be completed in parallel with step 206, which determines additional selections for the category.

FIG. 3 illustrates an exemplary GUI 300 operable to report possible class of service mismatches between a server resource "server1" and user objects that have privileges to access server 1. In some embodiments, GUI 300 may be an example of GUI 130 of FIG. 1. User objects USER104A-G have privileges to access Server1 because they are members of the user groups listed in the column titled "Group Access Obtained Through." For example, USER104A has access to server1 as a member of the group "domain1.com\admins."

The last column in GUI 300 indicates whether a possible class of service mismatch exists with Server1. In the example class of service attributes shown in FIG. 3, possible selections for the first and third field are "1," "2," "4," and any combination of the preceding. In this example, the selections for the second field are limited to the value "1." A field with a value of "0" in a class of service attribute indicates an undefined selection in the category. For example, in Step 204 of FIG. 2, a rule may indicate that if the information retrieved from the reference database does not have a corresponding selection, then the value for the field may be set to "0." Server1 has a class of service attribute of 5-1-1. Note that the first field is the arithmetic sum of "4" and "1." Class of service attributes for some of the users shown in GUI 300 are possible mismatches with the class of service attribute for server1.

In the example shown, user objects USER104A, USER104B, USER104E, and USER104F do not have class of service mismatches with server1. For example, USER104A has a value of "1" in the first field of its class of service attribute. As noted above, this is a possible component of the first field of the class of service attribute for server1. As such, there is no issue with the first field. USER104A has a value of "1" in the second field of its class of service attribute. This is an exact match with the second field of the class of service attribute for server1, so again there is no issue. USER104A has a value of "5" in the third field of its class of service attribute. This number is the arithmetic sum of "1" and "4." Because "1" is the value of the third field in the class of service attribute for server1, there is no class of service mismatch.

By contrast, GUI 300 indicates that possible class of service mismatches exist for USER104C, USER104D, and USER104G. USER104C has a class of service attribute of 4-1-4. This is a possible mismatch because the value of the last field is "4." The value "4" cannot be broken down into any power of two component that is equal to the value of the third field in class of service attribute of server 1. Rather, subtracting the largest power of two from "4" (which is also "4"), leaves only zero. Therefore, this is a class of service mismatch. USER104D has a class of service attribute of 5-1-4. This is a possible mismatch due the value of the last field in the attribute for the same reasons described with respect to USER104C. USER104G has a class of service attribute of 0-1-0. This is a possible mismatch because the first and third fields are undefined. In certain embodiments, a value of "0" in a field of a class of service attribute may always be reported as a possible class of service mismatch. In some embodiments, an administrator and/or administrative computer may receive this information and decide to remove one or more of USER104C, USER104D, and USER104G from the user groups that granted them privileges to access server1.

Modifications, additions, or omissions may be made to GUI 300 without departing from the scope of the invention. For example, GUI 300 may comprise one or more interactive fields, pull-down lists, buttons, and search boxes that facilitate searching for an appropriate object and/or group, such that possible class of service mismatches can be displayed. As another example, GUI 300 may include any suitable indicator to show that a possible class of service mismatch exists (e.g., color variations, displaying a flag, shape variations, etc.).

Certain embodiments of the invention may provide one or more technical advantages. A technical advantage of one embodiment allows for automatically categorizing users and resources by accessing one or more reference databases. Another technical advantage of an embodiment allows for automated reporting of users having elevated access rights to resources when they should not because of their class of service. Another technical advantage of an embodiment allows for this classification and reporting to be done on multiple platforms, such as Active Directory and Network Information Services. Another technical advantage of an embodiment is the ability to determine whether a possible mismatch occurs based on mathematical operations on the numerical values that represent the associated classes of service.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A class of service server for managing classification of objects in a directory service, comprising:
a memory comprising rules associated with determining values representative of a category of class of service; and
a processor communicatively coupled to the memory and operable to:
identify an object listed in a directory service;
receive classification information associated with the object from a reference database;
access a rule that specifies a value that corresponds to the classification information, wherein the value is based on a power of two classification model and indicates that the object is associated with a first selection in a classification category;
create a class of service attribute using the value;
associate the class of service attribute with the object listed in the directory service;
determine that the object is associated with a second selection in the classification category;
identify a second value that is a power of two that is associated with the second selection in the classification category;
calculate the sum of the value and the second value; and
use the calculated sum as part of the class of service attribute.

2. The server of claim 1, wherein the value represents a first classification category, the processor further operable to:
access a second rule that indicates values for a second category;
determine, from the second rule, a second value that corresponds to the classification information; and
create the class of service attribute with both the value and the second value.

3. The server of claim 1, wherein the object is included in a folder in the directory service, the processor further operable to create a class of service attribute for the folder based on the class of service attribute and a second class of service attribute associated with a second object in the folder.

4. The server of claim 1, wherein the object is a selected one of a user object and a server object.

5. The server of claim 1, wherein the class of service attribute comprises a plurality of fields, wherein each field represents a category of information associated with the object.

6. The server of claim 1, wherein the value is used for a field in the class of service attribute, the processor further operable to:
compare the value with a second value that is used for the field in a second class of service attribute, wherein the second class of service attribute is associated with a second object; and
determine that a class of service for the object is a possible mismatch for a class of service for the second object.

7. The server of claim 1, wherein the value is used for a field in the class of service attribute, the processor further operable to:
compare the value with a second value that is used for a different field in a second class of service attribute, wherein the second class of service attribute is associated with a second object; and
determine that a class of service for the object is a possible mismatch for a class of service for the second object.

8. A method for managing classification of objects in a directory service, comprising:
identifying an object listed in a directory service;
receiving classification information associated with the object from a reference database;
accessing, using a processor, a rule that specifies a value that corresponds to the classification information, wherein the value is based on a power of two classification model and indicates that the object is associated with a first selection in a classification category;
creating, using the processor, a class of service attribute using the value;
associating, using the processor, the class of service attribute with the object listed in the directory service;
determining that the object is associated with a second selection in the classification category;
identifying a second value that is a power of two that is associated with the second selection in the classification category;
calculating the sum of the value and the second value; and
using the calculated sum as part of the class of service attribute.

9. The method of claim 8, wherein the value represents a first classification category, the method further comprising:
accessing a second rule that indicates values for a second category;
determining, from the second rule, a second value that corresponds to the classification information; and
creating the class of service attribute with both the value and the second value.

10. The method of claim 8, wherein the object is included in a folder in the directory service, the method further comprising creating a class of service attribute for the folder based on the class of service attribute and a second class of service attribute associated with a second object in the folder.

11. The method of claim 8, wherein the object is a selected one of a user object and a server object.

12. The method of claim 8, wherein the class of service attribute comprises a plurality of fields, wherein each field represents a category of information associated with the object.

13. The method of claim 8, wherein the value is used for a field in the class of service attribute, the method further comprising:
comparing the value with a second value that is used for the field in a second class of service attribute, wherein the second class of service attribute is associated with a second object; and
determining that a class of service for the object is a possible mismatch for a class of service for the second object.

14. The method of claim 8, wherein the value is used for a field in the class of service attribute, the method further comprising:
comparing the value with a second value that is used for a different field in a second class of service attribute, wherein the second class of service attribute is associated with a second object; and
determining that a class of service for the object is a possible mismatch for a class of service for the second object.

15. A non-transitory computer readable medium comprising logic, the logic when executed by a processor, operable to:
identify an object listed in a directory service;
receive classification information associated with the object from a reference database;
access a rule that specifies a value that corresponds to the classification information, wherein the value is based on a power of two classification model and indicates that the object is associated with a first selection in a classification category;
create a class of service attribute using the value;
associate the class of service attribute with the object listed in the directory service;
determine that the object is associated with a second selection in the classification category;
identify a second value that is a power of two that is associated with the second selection in the classification category;
calculate the sum of the value and the second value; and
use the calculated sum as part of the class of service attribute.

16. The computer readable medium of claim 15, wherein the value is used for a field in the class of service attribute, wherein the logic is further operable to:
compare the value with a second value that is used for the field in a second class of service attribute, wherein the second class of service attribute is associated with a second object; and
determine that a class of service for the object is a possible mismatch for a class of service for the second object.

17. The computer readable medium of claim 15, wherein the value is used for a field in the class of service attribute, wherein the logic is further operable to:
compare the value with a second value that is used for a different field in a second class of service attribute, wherein the second class of service attribute is associated with a second object; and
determine that a class of service for the object is a possible mismatch for a class of service for the second object.

* * * * *